(12) United States Patent
Ikuta et al.

(10) Patent No.: US 7,104,484 B2
(45) Date of Patent: Sep. 12, 2006

(54) DRAG MECHANISM FOR A DUAL BEARING REEL

(75) Inventors: Takeshi Ikuta, Sakai (JP); Ken'ichi Kawasaki, Sakai (JP)

(73) Assignee: Shimano Inc., Osaka (JP)

( * ) Notice: Subject to any disclaimer, the term of this patent is extended or adjusted under 35 U.S.C. 154(b) by 10 days.

(21) Appl. No.: 11/113,023

(22) Filed: Apr. 25, 2005

(65) Prior Publication Data
US 2005/0253007 A1 Nov. 17, 2005

(30) Foreign Application Priority Data
May 11, 2004 (JP) .............................. 2004-141357

(51) Int. Cl.
*A01K 89/01* (2006.01)
(52) U.S. Cl. ...................... 242/304; 242/303
(58) Field of Classification Search ................ 242/244, 242/257, 285, 295, 303, 304
See application file for complete search history.

(56) References Cited

U.S. PATENT DOCUMENTS 5,318,246 A * 6/1994 Ikuta .......................... 242/303
5,560,562 A * 10/1996 Hartmann .................... 242/255
6,805,313 B1 * 10/2004 Nilsen ........................ 242/303

FOREIGN PATENT DOCUMENTS

JP         S63-167730 A        7/1988

* cited by examiner

*Primary Examiner*—Emmanuel M Marcelo
(74) *Attorney, Agent, or Firm*—Global IP Counselors, LLP (57) ABSTRACT

A drag mechanism has a drag operation member, a first cam member that is arranged on the inner peripheral portion of the drag operation member, a second cam member that is disposed opposite the first cam member, a drag adjustment member that is relatively rotatably mounted on the second cam member, a retaining member that retains the drag adjustment member in the axial direction relative to the second cam member, first and second urging members that urge the spool axially toward the drag operation member, a first brake member that is fixedly attached to the spool, and a second brake member that is movable in the axial direction of the spool shaft relative to the reel unit when at least one of the drag operation lever and the drag adjustment member is pivoted. Attachment and removal of the cam member can be performed easily.

14 Claims, 6 Drawing Sheets

DRAG MECHANISM FOR A DUAL BEARING REEL

BACKGROUND OF THE INVENTION

1. Field of the Invention

The present invention relates to a drag mechanism of a dual bearing reel. More particularly, the present invention relates to a drag mechanism of a dual bearing reel in which the braking force applied to the rotation of a spool in the line releasing direction changes, the spool is mounted on a spool shaft so as to be immovable in the axial direction and relatively rotatable, and the spool shaft is supported on a reel unit of the dual bearing reel so as to be immovable in the axial direction but relative unrotatable.

2. Background Information

Lever drag type dual bearing reels that move the spool shaft in the axial direction with a lever shaped drag operation member to brake the spool are generally known as dual bearing reels. Such dual bearing reel includes a reel unit having a pair of side plates and side covers, a spool shaft that is supported on the reel unit so as to be movable in the axial direction, a spool that is rotatively supported on the spool shaft, a drag mechanism that brakes the spool, and a rotation transmission mechanism that rotates the spool when a handle is rotated.

The spool is movable in the axial direction together with the spool shaft. The spool has a bobbin for winding fishing line around the outer periphery thereof, and flange portions which are arranged on both ends of the bobbin and project radially outward.

The drag mechanism includes a first brake member arranged on an outer side surface of one flange portion of the spool, a second brake member that can be pressed into contact with the first brake member, and a spool shaft movement mechanism that moves the spool shaft in the axial direction. The second brake member is rotatively supported on the spool shaft, and the rotation from the handle is transmitted to the second brake member via the rotation transmission mechanism.

The spool shaft movement mechanism has a lever shaped drag operation member that is pivotably supported on the reel unit, a cap shaped drag adjustment member that is fixedly coupled to one end of the spool shaft, and a cam member that is disposed between the drag operation member and the drag adjustment member and is non-rotatably mounted on the reel unit. Slant cams are formed on the cam member, and by pivoting the drag operation member, the drag operation member will raise the slant cams, and the cam member will press the drag adjustment member to move the spool shaft in one axial direction. Movement to the other axial direction of the spool shaft is carried out through the urging force of a spring member that is disposed, for example, between the first brake member and the second brake member.

With this type of dual bearing reel, the drive force due to the rotation of the handle is transmitted to the first brake member of the drag mechanism via the rotation transmission mechanism, and transmitted to the spool by pressing the first brake member and the second brake member into contact with each other. With this type of configuration, adjustment of the drag mechanism braking force is carried out by pivoting in one direction the drag operation member mounted on one end of the spool shaft. When the drag operation member is pivoted in one direction, the spool shaft will move in one of the axial directions through the cam member, which brings the spool closer to the drag mechanism. Accordingly, the first brake member is pressed into contact with the second brake member. With this type of dual bearing reel, the drag mechanism braking force will be adjusted by operating the drag operation member. Also, by operating the drag operation member, the first brake member and second brake member will move away from each other and place the spool in the free rotation state.

With a dual bearing reel having this type of drag mechanism, the cam member is non-rotatably mounted on the reel unit, and the drag adjustment member is mounted on the spool shaft so as to be rotatable and able to press the cam member. Japanese patent application publication No. 63-167730 shows an example of such structure. During the assembly of the drag mechanism in this dual bearing reel, the drag operation member will be rotatably mounted on the reel unit, and the cam member will be non-rotatably mounted on the reel unit. Next, the drag adjustment member will be screwed onto the tip of the spool shaft, so as to press the cam member.

In the drag mechanism of the aforementioned conventional dual bearing reel, in order to change the braking characteristics of with respect to the operational position of the drag operation member, one must consider replace the cam member with another cam member having a different slant angle. In order to replace the cam member with another cam member having a different slant angle, the drag adjustment member must first be removed from the spool shaft, and then the cam member must be removed. The task of removing the cam member may be quite time-consuming, and attaching and removing the cam member may be difficult.

In view of the above, it will be apparent to those skilled in the art from this disclosure that there exists a need for an improved drag mechanism for a dual bearing reel that overcomes the problems of the conventional art. This invention addresses this need in the art as well as other needs, which will become apparent to those skilled in the art from this disclosure.

SUMMARY OF THE INVENTION

An object of the present invention is to allow the cam member in a drag mechanism of a dual bearing reel to be easily attached and removed.

A drag mechanism for a dual bearing reel in accordance with the first aspect of the present invention is a drag mechanism for a dual bearing reel that is adapted to apply braking force to the rotation of a spool in the line releasing direction. The spool is mounted axially immovably and relatively rotatably on a spool shaft. The spool shaft is axially movably and relatively non-rotatably supported on a reel unit of the dual bearing reel. The drag mechanism includes a drag operation member, a first cam member, a second cam member, a drag adjustment member, a retaining member, an urging member, a first brake member, and a second brake member. The drag operation member is pivotably mounted on a first side of the reel unit. The first cam member is relatively non-rotatably arranged at an inner periphery of the drag operation member. The second cam member is axially immovably and relatively non-rotatably coupled to the spool shaft, the second cam member having a surface that is designed to contact with the first cam member. The drag adjustment member is relatively rotatably coupled to the second cam member. The drag adjustment member is relatively non-rotatably coupled to the spool shaft. The drag adjustment member together with the spool shaft is movable in the axial direction of the spool shaft toward the first side relative to the reel unit by pivoting around the spool shaft. The retaining member retains the second cam member axially immovably relative to the drag adjustment member. The urging member is disposed between the reel unit and the spool, and urges the spool in the axial direction of the spool shaft away from the first side. The first brake member is fixedly attached to the spool. The second brake member is mounted on the spool shaft so as to be axially immovable and non-rotatable in the line releasing direction of the spool, wherein at least part of the second brake member is axially opposite the first brake member. The second cam is movable in the axial direction of the spool shaft relative to the reel unit when at least one of the drag operation lever and the drag adjustment member is pivoted.

With the drag mechanism of this dual bearing reel, a retaining member that retains the drag adjustment member in the axial direction with respect to the second cam member is provided. Thus, when replacing the second cam member with another second cam member having a different slant angle, the drag adjustment member can be removed together with the second cam member. Therefore, the attachment and removal of the second cam member can be easily performed.

The drag mechanism for a dual bearing reel in accordance with the second aspect of the present invention is the drag mechanism in accordance with the first aspect of the present invention, in which the first cam member includes a plurality of cam pins. Here, by employing cam pins as the first cam member, a cam structure can be formed easily and inexpensively.

The drag mechanism for a dual bearing reel in accordance with the third aspect of the present invention is the drag mechanism in accordance with the first aspect of the present invention, in which the first cam member is a slant cam having slant surfaces fixedly arranged on an inner periphery of the drag operation member. Here, by making both the first cam member and the second cam member have slant surfaces, a cam structure that is capable of a greater variety of setting changes can be created by merely replacing the first cam member and the second cam member with others having different slant angles.

The drag mechanism for a dual bearing reel in accordance with the fourth aspect of the present invention is the drag mechanism in accordance with the first aspect of the present invention, in which the drag adjustment member is coupled to an outer periphery of the second cam member, and the retaining member is disposed between an outer peripheral surface of the second cam member and an inner peripheral surface of the drag adjustment member.

The drag mechanism for a dual bearing reel in accordance with the fifth aspect of the present invention is the drag mechanism in accordance with the fourth aspect of the present invention, in which the retaining member engages with a groove that is formed on one of the outer peripheral surface of the second cam member and the inner peripheral surface of the drag adjustment member, and a projection that is formed on the other of the outer peripheral surface of the second cam member and the inner peripheral surface of the drag adjustment member and a projection.

The drag mechanism for a dual bearing reel in accordance with the fifth aspect of the present invention is the drag mechanism in accordance with the fourth aspect of the present invention, in which the retaining member is disposed on a groove formed on the outer peripheral surface of the second cam member.

The drag mechanism for a dual bearing reel in accordance with the sixth aspect of the present invention is the drag mechanism in accordance with the fourth aspect of the present invention, in which the retaining member is an annular ring member. Here, for example, by employing an annular retaining ring member such as a C-shaped retaining ring or the like, the retaining member can be inexpensively constructed.

The drag mechanism for a dual bearing reel in accordance with the seventh aspect of the present invention is the drag mechanism in accordance with the first aspect of the present invention, in which the drag adjustment member further includes a step portion on its outer peripheral surface. Here, by pinching the step portion, the attachment and removal of the drag adjustment member can be performed easily.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
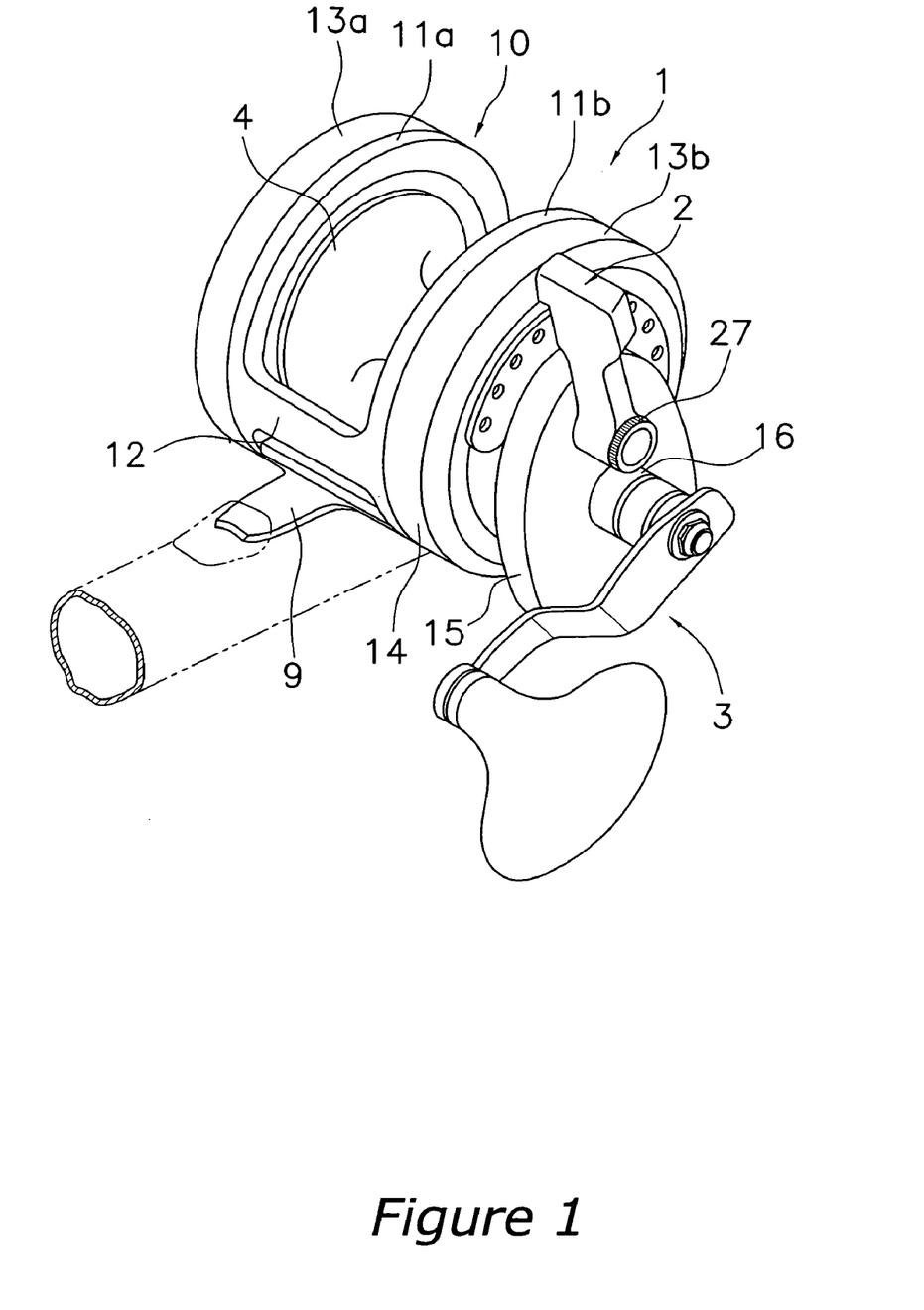
FIG. 1 is an oblique view of a dual bearing reel according to a first embodiment of the present invention.
Figure 2:
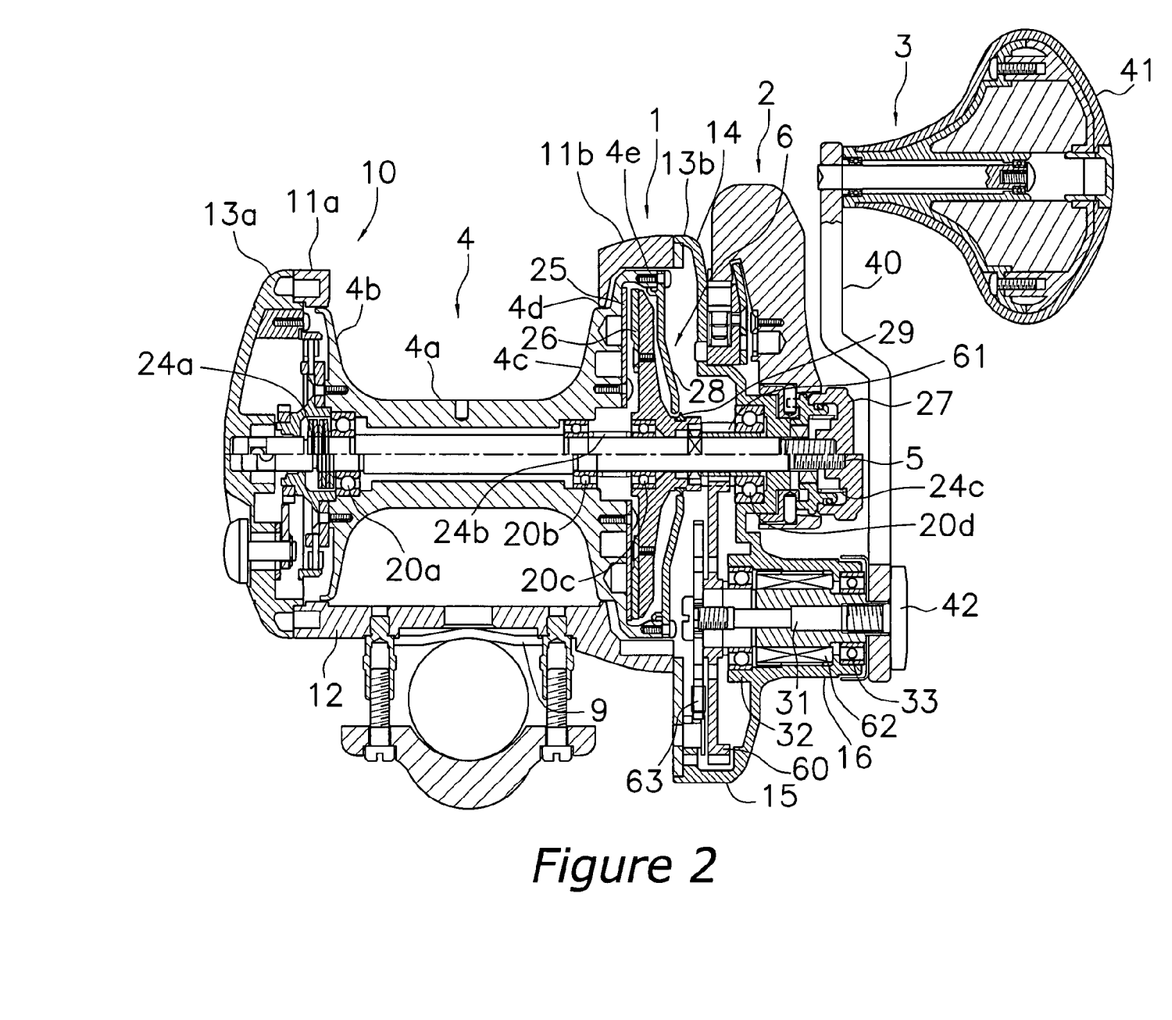
FIG. 2 is a cross-sectional view of the dual bearing reel according to the first embodiment of the present invention.

As shown in FIG. 1 and FIG. 2, a dual bearing reel according to one embodiment of the present invention is a mid-sized lever drag type, and includes a reel unit 1, a drag operation member 2 pivotably disposed on a side of the reel unit 1, a handle 3 rotatively supported on the reel unit 1 below the drag operation member 2, and a spool 4 disposed in the interior of the reel unit 1.

The reel unit 1 has a frame 10, and a first side cover 13a and a second side cover (an example of the first side of the reel unit) 13b that cover both sides of the frame 10. The frame 10 has a first side plate 11a and a second side plate 11b that are paired right to left, and a plurality of connectors 12 that connect the first side plate 11a and second side plate 11b. The first side plate 11a and the second side plate 11b are approximately circular in shape when viewed laterally, and the diameter of the second side plate 11b is formed to be larger than the diameter of the first side plate 11a. Preferably, the diameter of the second side plate 11b is in a range between 110% and 140% of the diameter of the first side plate 11a. In this embodiment, the diameter of the second side plate 11b is in a range between 110% and 120% of the diameter of the first side plate 11a. The plurality of connectors 12 are unitarily formed with the first side plate 11a and the second side plate 11b. As shown in FIG. 1 and FIG. 2, a rod mounting leg 9 that is made of metal and extends from front to rear is fixedly attached to the lower connectors 12 and serves to mount the reel to the fishing rod.

As shown in FIG. 1 and FIG. 2, the first side cover 13a is approximately circular in shape when viewed laterally and is mounted on one side of the first side plate 11a. The second side cover 13b has a tubular portion 14 that is mounted on one side of the second side plate 11b, and a bulging portion 15b that extends axially outward (the right side of FIG. 2) of the tubular portion 14. The first side cover 13a and the second side cover 13b are approximately circular in shape when viewed laterally and have approximately the same respective diameter as the first side plate 11a and the second side plate 11b, and the diameter of the second side cover 13b is formed to be larger than the diameter of the first side cover 13a. For example, the diameter of the second side cover 13b is in a range between 110% and 140% of the diameter of the first side cover 13a, and in this embodiment, is between 110% and 120% of the diameter of the first side cover 13a.

As shown in FIG. 1 and FIG. 2, the tubular portion 14 is a tubular member that is approximately circular in shape when viewed laterally and is mounted on one side of the second side plate 11b. A bulging portion 15 is unitarily formed with the tubular portion 14, so as to project axially outward (the right hand side of FIG. 2) so that there is a space in the interior that communicates with the interior of the tubular portion 14. The bulging portion 15 is an approximately oval shaped member when viewed laterally, and is formed so that the approximately semi-circular shaped portion on the lower portion thereof projects downward from the tubular portion 14. The drag operation member 2 and the handle 3 are mounted on the bulging portion 15 so that they are outwardly exposed.

As shown in FIG. 1 and FIG. 2, a projecting tube 16 for mounting the handle 3 is formed below the drag operation member 2 of the bulging portion 15 so as to project outward. As shown in FIG. 2, a handle shaft 31 is disposed in the interior of the projecting tube 16 in parallel with the spool shaft 5 (the rotation shaft of the spool 4). As shown in FIG. 2, the handle shaft 31 is rotatively supported on the projecting tube 16 by two bearings 32, 33 that are disposed on both ends of the projecting tube 16. A roller type first one way clutch 62 is disposed between the bearings 32, 33. The first one way clutch 62 permits rotation only in the line winding direction of the handle shaft 31. In addition, a ratchet type second one way clutch 63 is also disposed on the base end of the handle shaft 31. The second one way clutch 63 also permits rotation only in the line winding direction of the handle shaft 31.

As shown in FIG. 2, the handle 3 is fixedly coupled to the tip of the handle shaft 31. The handle 3 includes a handle arm 40 that is fixedly coupled to the tip of the handle shaft 31, and a handle knob 41 that is rotatively supported on the tip of the handle arm 40. The handle arm 40 is fixedly and relatively non-rotatably coupled to the tip of the handle shaft 31 with a screw member 42. The handle knob 41 serves to make it easy to grip and input force, and is formed into an approximate T-shape having a rounded exterior shape.

As shown in FIG. 2, the spool 4 has a tube-shaped bobbin 4a, and a first flange portion 4b and a second flange portion 4c that are formed on both ends of the bobbin 4a and have diameters that are larger than that of the bobbin 4a. The spool 4 is rotatably supported on the spool shaft 5 by means of bearings 20a, 20b. In addition, a drag mechanism 6 that brakes the spool 4 is arranged on the handle 3 side of the spool 4.

As shown in FIG. 2, the second flange portion 4c is formed so that the diameter thereof is larger than the diameter of the first flange portion 4b. As shown in enlarged form in FIG. 5, the second flange portion 4c has tubular small diameter portion 4d that is formed so that the bobbin 4a has a diameter smaller than that of a first brake member 25 (described below) that is part of the drag mechanism 6. Also, a tubular large diameter portion 4e is formed so that its outermost periphery has a larger diameter than that of the first brake member 25. The small diameter portion 4d is unitarily formed with the large diameter portion 4e such that a diameter of the small diameter portion 4d is smaller than that of the large diameter portion 4e. Also, the small diameter portion 4d is arranged so as to create a step portion between the large diameter portion 4e and the end of the bobbin 4a.

Figure 5:
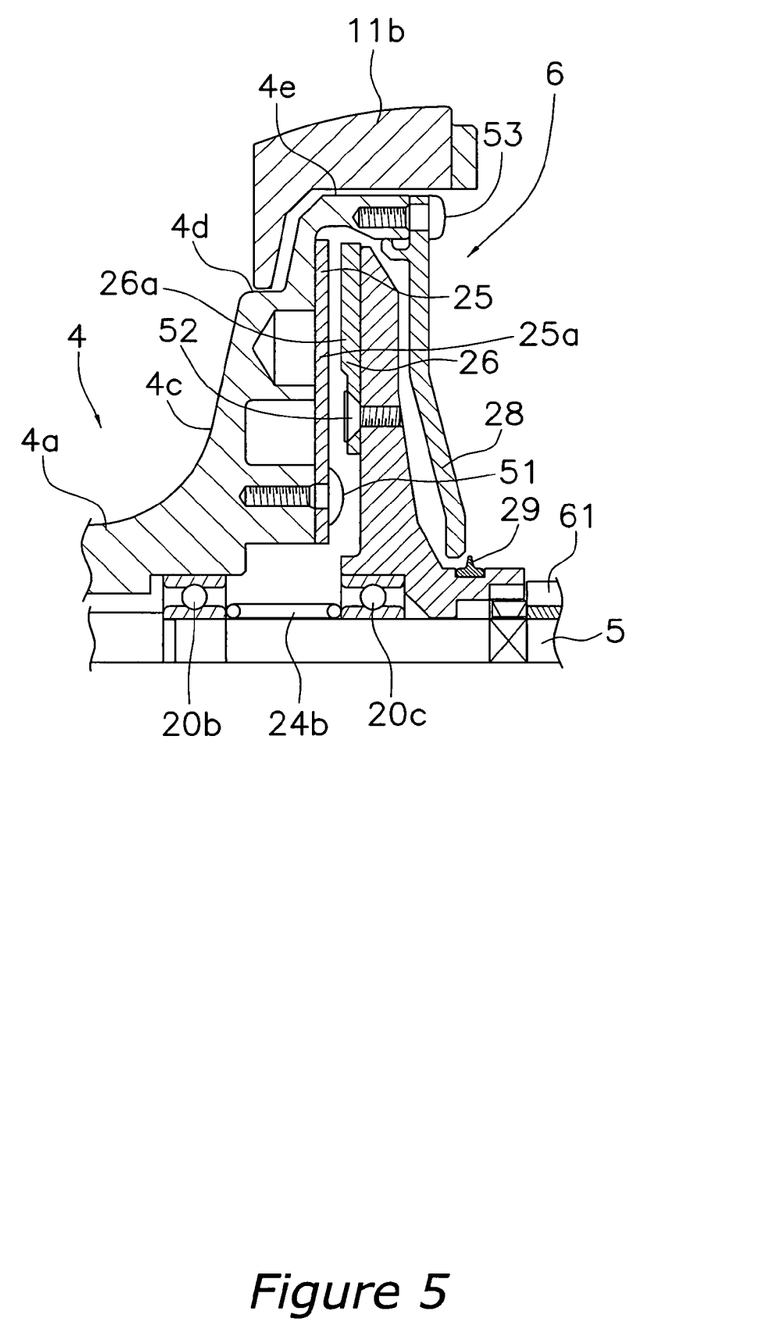
FIG. 5 is an enlarged cross-sectional view of the area around the first brake member according to the first embodiment of the present invention.

Here, fishing line will be wound around the outer periphery of the bobbin 4a. Particularly, the fishing line can be wound up to the outermost diameter of the small diameter portion 4d due to the step portion of the small diameter 4d. In addition, the second side plate 11b is disposed so as to cover between the large diameter portion 4e and the small diameter portion 4d, and the tip portion of the second side plate 11b extends inward in the radial direction so as to be near the small diameter portion 4d. Because of this structure, fishing line can be prevented from being wound on the outer periphery of the small diameter portion 4d, and fishing line can be restricted from moving outward in the axial direction.

As shown in FIG. 2, the diameter of the small diameter portion 4d is formed to be approximately the same as the diameter of the first flange portion 4b. The diameter of the large diameter portion 4e is preferably in the range of 110% to 140% of the diameter of the small diameter portion 4d. In this embodiment, the diameter of the large diameter portion 4e is between 120% and 130% of the diameter of the small diameter portion 4d. In addition, the diameter of the large diameter portion 4e is formed to be approximately the same as the diameter of the first side plate 11a and the first side cover 13a. In addition, the diameter of the first brake member 25 is preferably in the range of 90% or greater of the diameter of the small diameter portion 4d. In this embodiment, the diameter of the first brake member 25 is between 130% and 140% of the diameter of the small diameter portion 4d. In addition, the outer diameter of the bobbin 4a is 30% to 40% of the diameter of the small diameter portion 4d.

Figure 3:
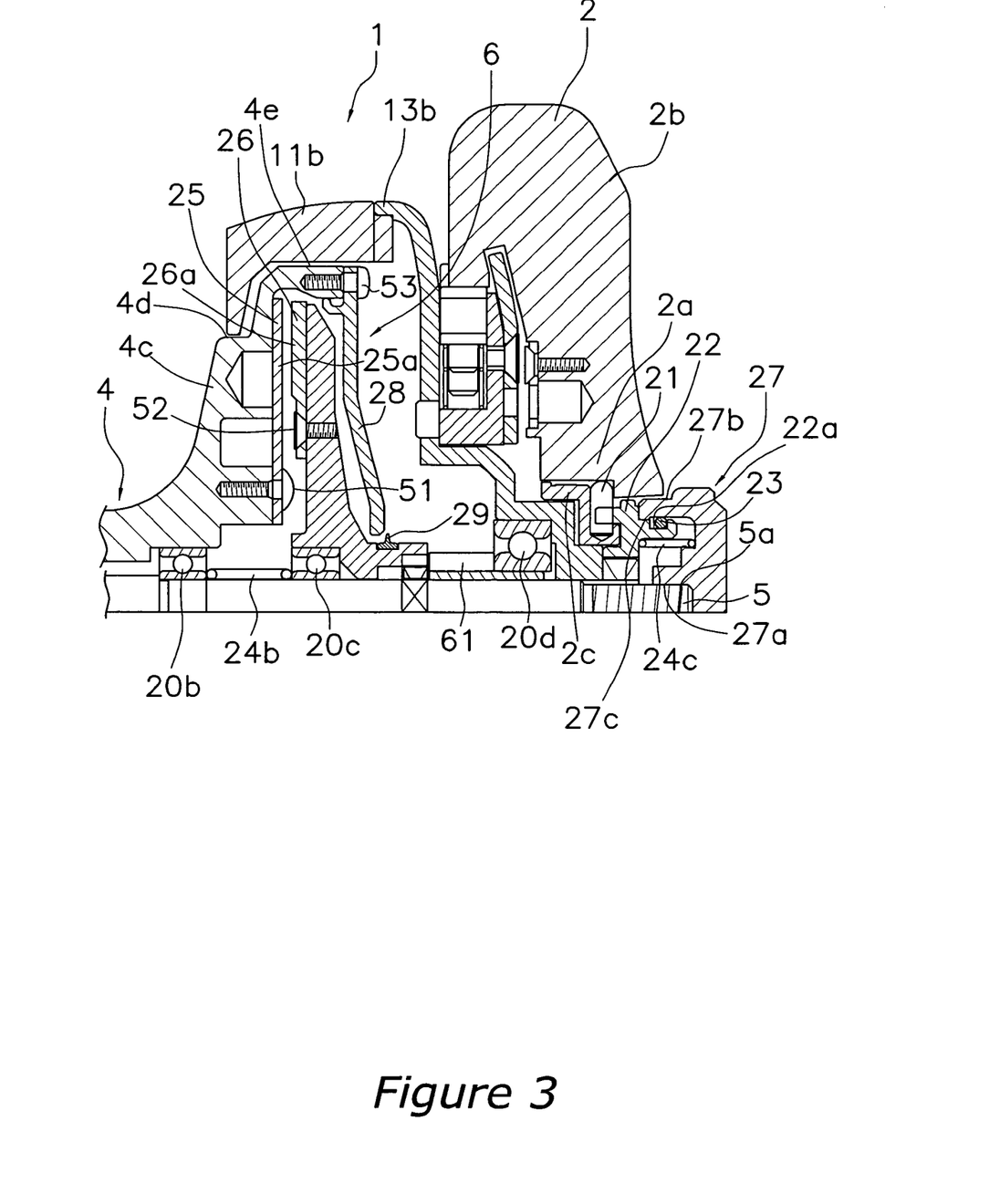
FIG. 3 is an enlarged cross-sectional view of the drag mechanism according to the first embodiment of the present invention.

As shown in FIG. 2, the drag mechanism 6 serves to change and adjust the braking force applied to the rotation of the spool 4 in the line releasing direction. The spool 4 is mounted on the spool shaft 5. As shown in FIG. 3, the drag mechanism 6 has the drag operation member 2, a first cam member 21 that is arranged on the inner peripheral portion of the drag operation member 2, a second cam member 22 that is disposed to be in contact with the first cam member 21, a drag adjustment member 27 that is relatively rotatably mounted on the second cam member 22 and designed to pull the spool shaft 5 outward (the right hand side in FIG. 2), a retaining member 23 that retains the drag adjustment member 27 in the axial direction with respect to the second cam member 22, a first urging member 24a (see FIG. 2) and a second urging member 24b that urge the spool 4 inward in the axial direction, a third urging member 24*c* that urges the drag adjustment member 27 outward in the axial direction (right hand side of FIG. 2), a first brake member 25 that is fixedly attached to the axial second side plate 13*b* side (the right side of FIG. 2) of the spool 4, and a second brake member 26 disposed to be contactable with the first brake member 25. Note that in FIG. 2 and FIG. 4, the upper half of the spool shaft 5 shows the axial position during maximum drag operation, and the lower half shows the reduced drag position.

As shown in FIG. 3, a boss portion 2*a* formed in the central portion of the drag operation member 2 is rotatively supported on the second side cover 13*b*, and a lever portion 2*b* that extends outward in the radial direction from the boss portion 2*a* is configured so as to engage at a plurality of locations in the circumferential direction on the second side cover 13*b*. In addition, as shown in FIG. 4, an attachment member 2*c* that serves to mount the first cam member 21 is relatively non-rotatably and fixedly coupled to the inner peripheral portion of the boss portion 2*a*.

Figure 4:
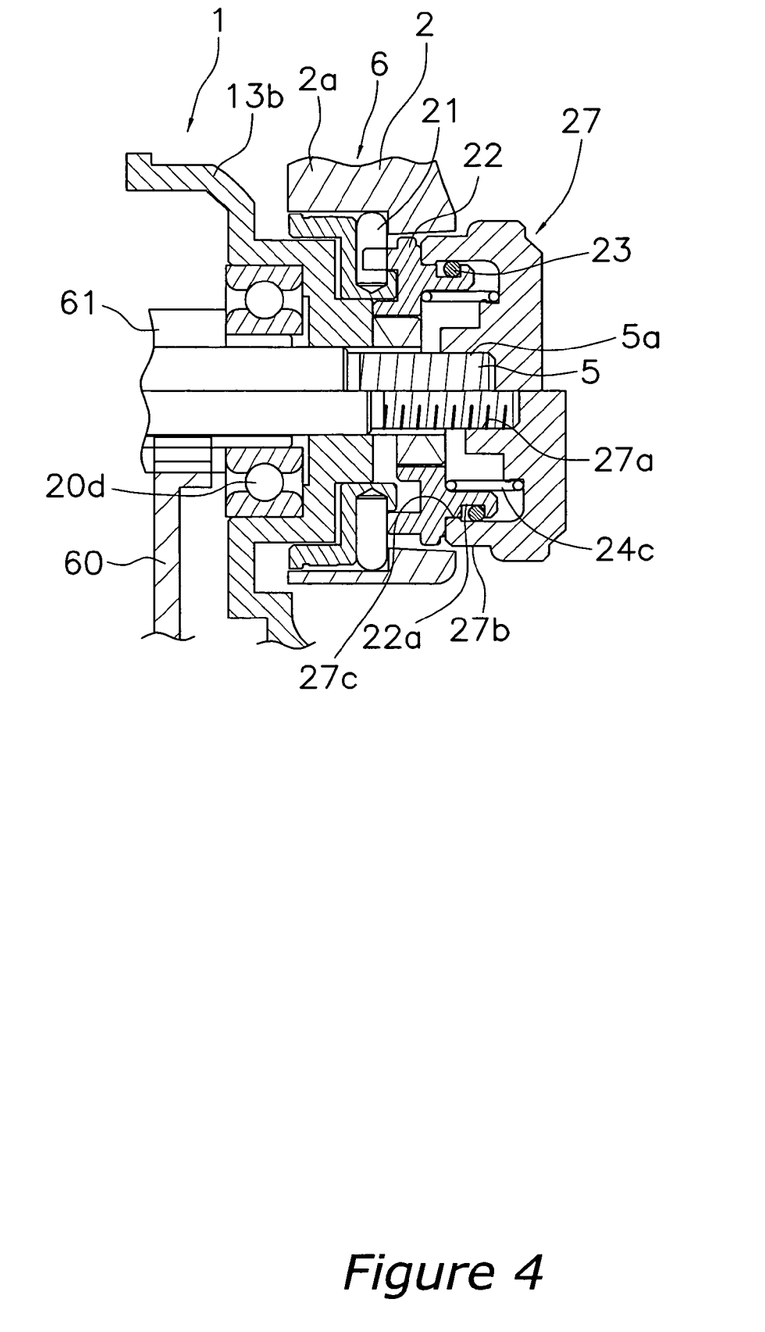
FIG. 4 is an enlarged cross-sectional view of the area around the drag mechanism according to the first embodiment of the present invention.

As shown in FIG. 4, the first cam member 21 is a group of bar shaped cam pins that are fixedly disposed at a plurality of locations on the attachment member 2*c* of the drag operation member 2. The second cam member 22 is disposed in contact with the first cam member 21, and is a tubular member that is movable in the axial direction in response to the pivoting of the first cam member 21 and non-rotatable with respect to the spool shaft 5. The second cam member 22 is a slant cam that has slanted surfaces where the second cam member 22 contacts with the first cam member 21. The inner peripheral portion of the second cam member 22 is non-rotatably mounted to the spool shaft 5. The second cam member 22 is retained in the axial direction with respect to the drag adjustment member 27 by the retaining member 23.

The second cam member 22 will move axially inward toward the spool 4 as shown on the upper side of FIG. 4 by pivoting the drag operation member 2 in the counter-clockwise direction of FIG. 1, and thereby weakens the drag force. In addition, when the drag operation member 2 is pivoted in the clockwise direction of FIG. 1, the second cam member 22 will move axially toward the second side plate 13*b* side (right hand side as shown on the lower side of FIG. 4), and thereby increases the drag force.

As shown in FIG. 4, the retaining member 23 is a C-shaped retaining ring which is made from, for example, a resilient synthetic resin. The retaining member 23 is disposed so as to contact with the outer peripheral surface of the second cam member 22 and the inner peripheral surface of the drag adjustment member 27, such that the second cam member 22 and the drag adjustment member 27 are linked by the urging force of the C-shaped retaining ring that attempts to expand outward. More specifically, the retaining member 23 is disposed on a groove 22*a* formed on the outer periphery of the second cam member 22. The retaining member 23 retains the second cam member 22 to the drag adjustment member 27 by engaging with the groove 22*a* and a projection 27*c*, which is an annular portion formed at an inner peripheral surface of the drag adjustment member 27 and projects radially inward. However, the shape and structure of the groove 22*a* and the projection 27*c* are not limited to those of this embodiment. Alternatively, the projection can include a plurality of projecting portions. Furthermore, the groove may be formed on the inner peripheral surface of the drag adjustment member 27, while the projection may be formed on the outer peripheral surface of the second cam member 22.

As shown in FIG. 4, the drag adjustment member 27 is a closed-end tubular shaped cap member, is relatively rotatably mounted on the second cam member 22, and is screwed onto the end of the spool shaft 5 that projects outward from the second side cover 13*b*. When the drag adjustment member 27 is rotated in the direction in which the drag adjustment member 27 is screwed onto the spool shaft 5, the spool shaft 5 is pulled axially toward the second side plate 13*b* (the right hand side of FIG. 4). A female threaded portion 27*a* is formed on the inner peripheral portion of the drag adjustment member 27. The female threaded portion 27*a* screws onto a male threaded portion 5*a* formed on the end of the spool shaft 5. The third urging member 24*c* is a coil spring, which is mounted between the inner peripheral portion of the drag adjustment member 27 and the axial end surface of the inner peripheral portion of the second cam member 22, such that the third urging member 24*c* continuously urges the drag adjustment member 27 outward. A step portion 27*b*, of which the surface is lowered as compared with the surrounding surface, is formed along the circumferential direction on the tip of the outer peripheral surface of the drag adjustment member 27. The user can grasp and pull the step portion 27*b* outward in the axial direction (the right hand side in FIG. 4) when the drag adjustment member 27 is to be attached or removed. In this manner, the drag adjustment member 27 will be easily attached and removed.

When rotated in the counter-clockwise direction, the drag adjustment member 27 will move only slightly axially leftward as shown on the upper side of FIG. 4, and thereby slightly weaken the drag force. In addition, when rotated in the clockwise direction, the drag adjustment member 27 will move only slightly axially rightward as shown on the lower side of FIG. 4, and thereby slightly increase the drag force.

As shown in FIG. 2, the spool shaft 5 is a shaft member that is supported on the reel unit 1 to be movable in the axial direction and non-rotatable relative thereto. Bearings 20*a*, 20*b* that serve to rotatably mount the spool 4, and a bearing 20*c* that serves to rotatably support the second brake member 26 (described below), are mounted on the outer periphery of the spool shaft 5. As shown in FIG. 2 and FIG. 3, the second urging member 24*b*, which is a coil spring that urges the spool 4 axially toward the first side plate 13*a* (the left hand side of FIG. 2) is mounted on the outer periphery of the spool shaft 5 between the bearings 20*a*, 20*b*. In addition, as shown in FIG. 2, the first urging member 24*a*, which is a plate spring that urges the spool 4 axially toward the first side plate 13*a* (the left side of FIG. 2) is mounted on the outer periphery of the spool shaft 5 axially outside of the bearing 20*a* (the left side of FIG. 2). The first urging member 24*a* has an urging force that is stronger than that of the second urging member 24*b*. Because of this, when the spool shaft 5 moves in the axial direction, the first urging member 24*a* will operate first, and then thereafter the second urging member 24*b* will operate.

In addition, a bearing 20*d* is mounted on the inner peripheral portion of the second side cover 13*b*, and supports the outer peripheral portion of a pinion gear 61 mounted on the outer periphery of the spool shaft 5. As shown in FIG. 2, the pinion gear 61 meshes with a main gear 60 fixedly coupled to the spool-side end of the handle shaft 31. The tip of the pinion gear 61 is fixedly coupled to the inner peripheral side of the second brake member 26. As a result, the rotation from the handle 3 will be transmitted to the first brake member 25 via the main gear 60, the pinion gear 61, and the second brake member 26. The rotation will be further transmitted from the first brake member 25 to the spool 4, so that the spool 4 will rotate.

As shown in FIG. 2 and FIG. 3, the first brake member 25 is an annular member that is disposed in the interior of the second side cover 11b and is fixedly disposed on the axial second side plate 13b side of the spool 4 (the right hand side of FIG. 2). The first brake member 25 is formed to have a larger diameter than that of the small diameter portion 4d of the second flange portion 4c, which is the diameter of spool 4 up to which fishing line can be wound.

The second brake member 26 is disposed to be contactable with the first brake member 25, and is mounted on the spool shaft 5 so as to be non-movable in the axial direction and non-rotatable in the line releasing direction of the spool 4. The second brake member 26 has a diameter that is slightly smaller than that of the first brake member 25, and is rotatably supported on the spool shaft 5 by the bearing 20c. The second brake member 25 is rendered non-rotatable in the line-releasing direction of the spool 4 due to its engagement with the pinion gear 61, which engages with main gear 60. The inner peripheral surface of the second brake member 26 meshes with the pinion gear 61. In addition, the axially outward movement (the right hand side of FIG. 2) of the second brake member 26 is restricted by the reel unit 1 via the pinion gear 61 and the bearing 20d.

As shown in an enlarged view in FIG. 5, the first brake member 25 and the second brake member 26 respectively have a donut-shaped first sliding disk 25a and a second sliding disk 26a that have approximately the same diameter and are mounted on opposing surfaces. Accordingly, the first sliding disk 25a and the second sliding disk 26a are pressed into contact with each other. The first sliding disk 25a and the second sliding disk 26a are respectively fixedly attached to the first brake member 25 and the second brake member 26 by a plurality of screw members 51, 52. The first sliding disk 25a is, for example, made of a heat resistant synthetic resin such as a fiber reinforced resin or the like in which a heat resistant resin such as a phenol resin or the like is impregnated in a carbon fiber fabric. The second sliding disk 26a is, for example, made of a heat and corrosion resistant metal such as stainless steel or the like.

In addition, a cover disk 28 that covers the first brake member 25 and the second brake member 26 is non-rotatably linked to the axially outward tip (right hand side of FIG. 2) of the large diameter portion 4e of the second flange portion 4c. The cover disk 28 is a disk-shaped member that extends in the spool shaft 5 direction so as to entirely cover the axially outward side of the second brake member 26 (the right hand side of FIG. 2). The cover disk 28 is fixedly coupled to the tip of the large diameter portion 4e of the second flange portion 4c with screw members 53. In addition, an O-ring 29 is sealed in the outer peripheral portion of the second brake member 26, between the cover disk 28 and the second brake member 26.

In a dual bearing reel configured as above, when the terminal tackle is to be lowered, the drag operation member 2 will be operated to separate the spool 4 from the drag mechanism 6. As a result, the spool 4 will be freely rotatable, and the weight of the terminal tackle alone will wind out the fishing line.

After the terminal tackle has arrived at a predetermined water depth, the drag operation member 2 will be operated to engage the spool 4 and the drag mechanism 6. When the spool 4 and the drag mechanism 6 are engaged, the rotation from the handle 3 will be transmitted to the spool 4 via the main gear 60, the pinion gear 61, and the drag mechanism 6, and the spool 4 can be rotated by the handle 3. When a fish strikes the terminal tackle in this state, the spool 4 will rotate in the line releasing direction due to the pull of the fish.

At this point, the fishing line will be wound out at a predetermined drag force set by operation of the drag operation member 2. Here, when the drag operation member 2 is pivoted in the clockwise direction of FIG. 1, the first cam member 21 will move the second cam member 22 axially outward (the right hand side of FIG. 2), and thus the spool shaft 5 will move axially outward (the right hand side of FIG. 2). When the spool shaft 5 moves axially outward (the right hand side of FIG. 2), the spool 4 will also move axially outward (the right hand side of FIG. 2), the first brake member 25 that is fixedly coupled to the axial outside of the spool 4 will move in the direction toward the second brake member 26, and the first brake member 25 and the second brake member 26 will be strongly pressed into contact with each other, and increase the drag force. On the other hand, when the drag operation member 2 is pivoted in the counter-clockwise direction of FIG. 1, the spool shaft 5 will return axially inward (the left hand side of FIG. 2) through the first urging member 24a and the second urging member 24b. Accordingly, the first brake member 25 will move away from the second brake member 26, and the pressing force of the first brake member 25 and the second brake member 26 will weaken and thus weakens the drag force.

In addition, when one wants to minutely adjust the drag force of the drag mechanism 6, the drag adjustment member 27 is rotated. When the drag adjustment member 27 is rotated in the clockwise direction, the spool shaft 5 will move axially outward (the right hand side of FIG. 2) only slightly. Thus, the pressing force between the first brake member 25 and the second brake member 26 will increase only slightly, and thus the drag force will increase slightly. On the other hand, when the drag adjustment member 27 is rotated in the counter-clockwise direction, the spool shaft 5 will move axially inward (the left side of FIG. 2) only slightly, the pressing force between the first brake member 25 and the second brake member 26 will decrease only slightly, and thus the drag force will weaken slightly.

With this type of drag mechanism 6, in order to change the brake characteristics with respect to the operating position of the drag operation member 2, the second cam member 22 may have to be replaced with another second cam member having a different slant angle. Here, in replacing the second cam member 22, the drag adjustment member 27 can be removed together with the second cam member 22. Thus, by removing the drag adjustment member 27 that is coupled integrally with the second cam member 22 by means of the retaining member 23 from the spool shaft 5, the second cam member 22 can be easily removed.

With the drag mechanism 6 of this type of dual bearing reel, the retaining member 23 is provided in order to retain the drag adjustment member 2 in the axial direction with respect to the second cam member 22. Because of this, when the second cam member 22 is to be replaced with another second cam member having a different slant angle, the drag adjustment member 27 can be removed together with the second cam member 22, and thus the attachment and removal of the second cam member can be easily performed.

Other Embodiments (a) In the aforementioned embodiment, a mid-sized dual bearing reel was employed. However, the size and shape of the reel is not limited to this. For example, a large dual bearing reel may be constructed such that the connectors 12 are provided on the upper portion of the reel unit 1.

(b) In the aforementioned embodiment, only the drag operation member 2 and the drag adjustment member 27 are provided in the drag mechanism 6 as operation members that can be operated from the exterior. However, for example, operation members or the like for locking and unlocking the drag mechanism 6 may be separately provided.

Figure 6:
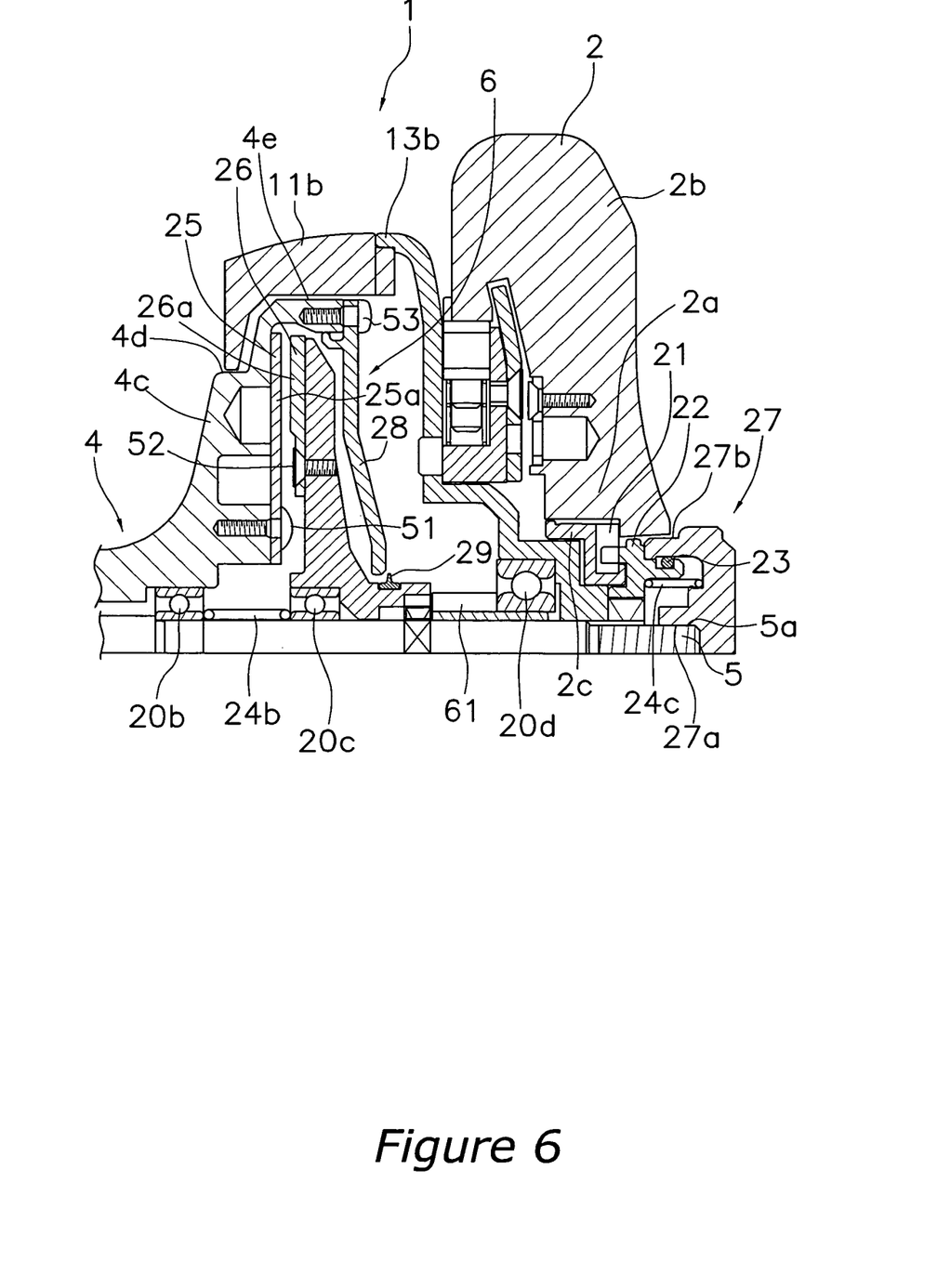
FIG. 6 is an enlarged cross-sectional view of the drag mechanism according to the other embodiment (c) of the present invention.

(c) In the aforementioned embodiment, the first cam member 21 is cam pins capable of contacting with the slant surface of the second cam member 22. However, as shown in FIG. 6, the first cam member 21' may be a slant cam capable of contacting with the slant surface of the second cam member 2'. Note that in the embodiment shown in FIG. 6, the slant surface is formed on the attachment member 2c that is fixedly coupled to the inner periphery of the drag operation member 2. However, the drag operation member 2 and the attachment member 2c may be unitarily formed, and the slant surface may be formed on the drag operation member 2. Here, by making both the first cam member 21 and the second cam member 22 into slant cams, a cam structure that is capable of a greater variety of setting changes can be achieved by replacing the first cam member 21 and the second cam member 22 with others having different slant angles.

In FIG. 6, in view of the similarity between the first and alternative embodiments, the parts of the alternative embodiment that are identical to the parts of the first embodiment is given the same reference numerals as the parts of the first embodiment. Moreover, the descriptions of the parts of the alternative embodiment that are identical to the parts of the first embodiment is omitted for the sake of brevity. The parts of the alternative embodiment that differ from the parts of the first embodiment are indicated with a prime (').

According to the present invention, in the drag mechanism of the dual bearing reel, a retaining member that retains the drag adjustment member in the axial direction with respect to the second cam member is provided, and thus the attachment and removal of the second cam member can be easily performed.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2004-141357. The entire disclosure of Japanese Patent Application No. 2004-141357 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A drag mechanism for a dual bearing reel that is adapted to apply braking force to the rotation of a spool in the line releasing direction, the spool being mounted axially immovably and relatively rotatably on a spool shaft, the spool shaft being axially movably and relatively non-rotatably supported on a reel unit of the dual bearing reel, the drag mechanism comprising:
    a drag operation member that is pivotably mounted on a first side of the reel unit;
    a first cam member that is relatively non-rotatably arranged at an inner periphery of the drag operation member;
    a second cam member that is axially immovably and relatively non-rotatably coupled to the spool shaft, the second cam member having a surface that is designed to contact with the first cam member;
    a drag adjustment member that is relatively rotatably coupled to the second cam member, the drag adjustment member being relatively non-rotatably coupled to the spool shaft, the drag adjustment member together with the spool shaft being movable in the axial direction of the spool shaft toward the first side relative to the reel unit by pivoting around the spool shaft;
    a retaining member that retains the second cam member axially immovably relative to the drag adjustment member;
    an urging member that is disposed between the reel unit and the spool, and urges the spool in the axial direction of the spool shaft away from the first side;
    a first brake member that is fixedly attached to the spool; and
    a second brake member that is mounted on the spool shaft so as to be axially immovable and non-rotatable in the line release direction of the spool, wherein at least part of the second brake member is axially opposite the first brake member,
    the second cam being movable in the axial direction of the spool shaft relative to the reel unit when at least one of the drag operation lever and the drag adjustment member is pivoted.

2. The drag mechanism for a dual bearing reel set forth in claim 1, wherein
    the first cam member includes a plurality of cam pins.

3. The drag mechanism for a dual bearing reel set forth in claim 1, wherein
    the first cam member has slant surfaces and is fixedly arranged on an inner periphery of the drag operation member.

4. The drag mechanism for a dual bearing reel set forth in claim 1, wherein
    the drag adjustment member is coupled to an outer periphery of the second cam member, and
    the retaining member is disposed between an outer peripheral surface of the second cam member and an inner peripheral surface of the drag adjustment member.

5. The drag mechanism for a dual bearing reel set forth in claim 4, wherein
    the retaining member engages with a groove that is formed on one of the outer peripheral surface of the second cam member and the inner peripheral surface of the drag adjustment member, and a projection that is formed on the other of the outer peripheral surface of the second cam member and the inner peripheral surface of the drag adjustment member and a projection.

6. The drag mechanism for a dual bearing reel set forth in claim 4, wherein the retaining member is an annular ring member.

7. The drag mechanism for a dual bearing reel set forth in claim 1, wherein the drag adjustment member further includes a step portion on its outer peripheral surface.

8. A double bearing reel, comprising:

a reel unit;

a drag operation member pivotably disposed on a side of the reel unit a handle rotatively supported on the reel unit;

a spool axially movably and relatively non-rotatably supported in the interior of the reel unit and; and a drag mechanism adapted to apply braking force to the rotation of the spool in the line releasing direction and including the drag operation member that is pivotably mounted on a first side of the reel unit, a first cam member that is relatively non-rotatably arranged at an inner periphery of the drag operation member, a second cam member that is axially immovably and relatively non-rotatably coupled to the spool shaft, the second cam member having a surface that is designed to contact with the first cam member, a drag adjustment member that is relatively rotatably coupled to the second cam member, the drag adjustment member being relatively non-rotatably coupled to the spool shaft, the drag adjustment member together with the spool shaft being movable in the axial direction of the spool shaft toward the first side relative to the reel unit by pivoting around the spool shaft, a retaining member that retains the second cam member axially immovably relative to the drag adjustment member, an urging member that is disposed between the reel unit and the spool, and urges the spool in the axial direction of the spool shaft away from the first side;

a first brake member that is fixedly attached to the spool, and a second brake member that is mounted on the spool shaft so as to be axially immovable and non-rotatable in the line releasing direction of the spool, wherein at least part of the second brake member is axially opposite the first brake member, the second cam being movable in the axial direction of the spool shaft relative to the reel unit when at least one of the drag operation lever and the drag adjustment member is pivoted.

9. The dual bearing reel set forth in claim 8, wherein the first cam member includes a plurality of cam pins.

10. The dual bearing reel set forth in claim 8, wherein the first cam member has slant surfaces and is fixedly arranged on an inner periphery of the drag operation member.

11. The dual bearing reel set forth in claim 8, wherein the drag adjustment member is coupled to an outer periphery of the second cam member, and the retaining member is disposed between an outer peripheral surface of the second cam member and an inner peripheral surface of the drag adjustment member.

12. The dual bearing reel set forth in claim 11, wherein the retaining member engages with a groove that is formed on one of the outer peripheral surface of the second cam member and the inner peripheral surface of the drag adjustment member, and a projection that is formed on the other of the outer peripheral surface of the second cam member and the inner peripheral surface of the drag adjustment member and a projection.

13. The dual bearing reel set forth in claim 11, wherein the retaining member is an annular ring member.

14. The dual bearing reel set forth in claim 8, wherein the drag adjustment member further includes a step portion on its outer peripheral surface.

* * * * *